United States Patent
Bhardwaj et al.

(10) Patent No.: US 11,565,343 B2
(45) Date of Patent: Jan. 31, 2023

(54) LASER-WELDED FAUCET

(71) Applicant: Kohler Co., Kohler, WI (US)

(72) Inventors: Arun Bhardwaj, Gurugram (IN);
Lokesh Mohanpuri, New Delhi (IN);
Jayarama M. Murthy, Bengaluru (IN)

(73) Assignee: Kohler Co., Kohler, WI (US)

( * ) Notice: Subject to any disclaimer, the term of this patent is extended or adjusted under 35 U.S.C. 154(b) by 497 days.

(21) Appl. No.: 16/032,899

(22) Filed: Jul. 11, 2018

(65) Prior Publication Data

US 2019/0015927 A1 Jan. 17, 2019

(30) Foreign Application Priority Data

Jul. 13, 2017 (IN) .............................. 201711024848

(51) Int. Cl.
| | |
|---|---|
| B23K 26/00 | (2014.01) |
| B21D 22/02 | (2006.01) |
| B23K 26/24 | (2014.01) |
| E03C 1/04 | (2006.01) |
| B23K 101/04 | (2006.01) |
| C25D 7/04 | (2006.01) |

(52) U.S. Cl.
CPC .......... *B23K 26/0093* (2013.01); *B21D 22/02* (2013.01); *E03C 1/04* (2013.01); *B23K 26/24* (2013.01); *B23K 2101/04* (2018.08); *C25D 7/04* (2013.01)

(58) Field of Classification Search
CPC ............ B23K 26/0093; B23K 2101/04; B23K 26/24; B21D 22/02; E03C 1/04; C25D 7/04

USPC ....................................................... 219/121.63
See application file for complete search history.

(56) References Cited

U.S. PATENT DOCUMENTS

| | | | | |
|---|---|---|---|---|
| 4,514,613 A | * | 4/1985 | Hill ........................ | B23K 26/28 |
| | | | | 219/121.13 |
| 4,576,030 A | * | 3/1986 | Roper .................... | B21D 22/02 |
| | | | | 72/293 |
| 4,777,708 A | * | 10/1988 | Harwood ............... | B21D 53/88 |
| | | | | 228/173.3 |
| 4,840,303 A | * | 6/1989 | Fujii ...................... | B23K 26/26 |
| | | | | 228/164 |

(Continued)

FOREIGN PATENT DOCUMENTS

| | | |
|---|---|---|
| CN | 1447053 | 10/2003 |
| CN | 101101072 | 1/2008 |

(Continued)

OTHER PUBLICATIONS

Zhou et al., Translation of CN104043901A, 2014.*

(Continued)

*Primary Examiner* — Eric S Stapleton
(74) *Attorney, Agent, or Firm* — Patterson Thuente, P.A.

(57) ABSTRACT

A method for manufacturing a faucet including a base and a spout includes providing a first faucet portion defining a first edge extending a distance between the base and the spout, providing a second faucet portion defining a second edge extending the distance, welding, by a laser welding apparatus, the first edge of the first faucet portion to the second edge of the second faucet portion to form a welded joint extending along the distance, and grinding the welded joint to form a faucet body.

16 Claims, 5 Drawing Sheets

(56) References Cited

U.S. PATENT DOCUMENTS

| | | | | |
|---|---|---|---|---|
| 4,983,797 A * | 1/1991 | McAllister | ......... | B23K 26/0823 |
| | | | | 219/121.64 |
| 5,245,156 A * | 9/1993 | Kamogawa | ............ | B23K 26/24 |
| | | | | 219/121.64 |
| 5,250,783 A * | 10/1993 | Nishi | ..................... | B23K 26/26 |
| | | | | 219/121.64 |
| 5,431,326 A * | 7/1995 | Ni | .......................... | B21D 22/02 |
| | | | | 228/155 |
| 5,829,468 A * | 11/1998 | Watanabe | ............. | B21C 37/292 |
| | | | | 137/15.08 |
| 6,270,600 B1 * | 8/2001 | Wycech | .................. | B29C 44/12 |
| | | | | 156/79 |
| 6,794,603 B1 * | 9/2004 | Musselman | .......... | B23K 26/244 |
| | | | | 219/121.64 |
| 7,246,416 B2 * | 7/2007 | Duffy | ................. | A44B 18/0049 |
| | | | | 24/444 |
| 7,494,556 B2 * | 2/2009 | Von Mertz | ................ | E03C 1/33 |
| | | | | 156/250 |
| 9,272,368 B2 * | 3/2016 | Fuhrmann | ............. | B23K 26/211 |
| 2004/0083786 A1 * | 5/2004 | Garnett | .................. | B21D 22/02 |
| | | | | 72/348 |
| 2008/0128053 A1 * | 6/2008 | Jansen | .................... | B23K 31/12 |
| | | | | 148/400 |
| 2008/0295563 A1 * | 12/2008 | Terziakin | ................ | C21D 1/673 |
| | | | | 72/364 |
| 2011/0120571 A1 * | 5/2011 | Derge | .................... | F16K 31/607 |
| | | | | 137/315.15 |
| 2013/0255346 A1 * | 10/2013 | Danby | .................... | B21D 37/01 |
| | | | | 72/352 |
| 2014/0021176 A1 * | 1/2014 | Fuhrmann | .............. | B23K 26/32 |
| | | | | 219/121.64 |
| 2015/0174883 A1 * | 6/2015 | Han | .................. | B29C 66/73521 |
| | | | | 156/380.9 |
| 2016/0333555 A1 * | 11/2016 | Liang | .................... | E03C 1/0404 |

FOREIGN PATENT DOCUMENTS

| | | | | |
|---|---|---|---|---|
| CN | 201121734 | | 9/2008 | |
| CN | 201121734 Y | * | 9/2008 | |
| CN | 202087924 | | 12/2011 | |
| CN | 102886657 | | 1/2013 | |
| CN | 104043901 | | 9/2014 | |
| CN | 104043901 A | * | 9/2014 | |
| CN | 203809761 | | 9/2014 | |
| CN | 203809761 U | * | 9/2014 | |
| CN | 204004666 | | 12/2014 | |
| CN | 105003708 | | 10/2015 | |
| CN | 205614264 | | 10/2016 | |
| DE | 102008042300 | | 6/2010 | |
| DE | 102010036419 | | 1/2012 | |
| EP | 2184411 | | 5/2010 | |

OTHER PUBLICATIONS

Jianren et al., Translation of CN201121734Y, 2008.*
Liu et al., Translation of CN203809761U, 2014.*
Indian Examination Report re Application No. 201711024848 dated Jul. 30, 2019; 6 pages.
English language translation of Chinese Office Action, App. No. 201810763624.7 (dated Apr. 2, 2020).
CN Third Office Action for CN Application No. 201810763624.7 dated Sep. 10, 2020 (22 Pages) (English Translation).
Decision of Rejection for CN Patent Application No. 201810763624.7 dated Dec. 3, 2020, with English summary 14 pages.

* cited by examiner

LASER-WELDED FAUCET

CROSS REFERENCE TO RELATED APPLICATIONS

This application claims the benefit of and priority to Indian Patent Application No. 201711024848, filed Jul. 13, 2017, the entire disclosure of which is hereby incorporated by reference herein.

BACKGROUND

The present application relates generally to a faucet and a method of assembling a faucet. In particular, this application relates to a method of constructing a faucet body using a laser welding process.

Faucet assemblies may include a faucet body, handles, valve cartridges, and a waterway. Faucet bodies may define the waterway and be configured to be coupled to the handles and valve cartridges. Conventional faucet bodies may be manufactured by, among other ways, forming the faucet body around a core (i.e., in a cast or mold) using a casting process.

Generally, the minimum wall thickness that can be achieved when manufacturing the faucet body via a conventional casting process is between 2.5 mm and 3.5 mm while the minimum thickness necessary to achieve a required structural strength of the faucet body is less than that. As such, conventional faucet body manufacturing processes lead to the utilization of more material than necessary.

Additionally, the conventional casting processes for faucet bodies leads to the introduction of foreign particles and other impurities into a finished faucet body. Such impurities typical manifest themselves after the entire die casting process is completed and the surface is subjected to a finishing process, resulting in the rejection of a large number of parts post fabrication.

SUMMARY OF THE INVENTION

One embodiment relates to a method for manufacturing a faucet including a base and a spout. The method includes providing a first faucet portion defining a first edge extending a distance between the base and the spout. The method also includes providing a second faucet portion defining a second edge extending the distance. The method also includes welding, by a laser welding apparatus, the first edge of the first faucet portion to the second edge of the second faucet portion to form a welded joint extending along the distance. The method also includes grinding the welded joint to form a faucet body.

Another embodiment relates to a method for manufacturing a faucet including a base and a spout. The method includes providing a first faucet portion defining a first edge extending a first distance between an end of the base and the spout and a second edge extending a second distance between an upper end of the faucet and the end of the base. The method also includes providing a second faucet portion defining a third edge extending the first distance and a fourth edge extending the second distance. The method also includes welding, by a laser welding apparatus, the first edge of the first faucet portion to the third edge of the second faucet portion to form a first welded joint extending at least a portion of the first distance from the end of the base. The method also includes welding, by a laser welding apparatus, the second edge of the first faucet portion to the fourth edge of the second faucet portion to form a second welded joint extending at least a portion of the second distance from the end of the base.

Another embodiment relates to a faucet body of a faucet. The faucet body includes a first faucet body portion including a first base portion extending in a first direction and a first spout portion extending in a second direction at an angle to the first direction. The faucet body also includes a second faucet body portion including a second base portion extending in the first direction and a second spout portion extending in the second direction at the angle to the first direction. The faucet body also includes a first welded joint disposed between the first body portion and the second body portion and extending in a direction parallel to a direction in which water flows through the faucet.

It is to be understood that both the foregoing general description and the following detailed description are exemplary and explanatory only, and are not restrictive of the invention as claimed.

The invention is capable of other embodiments and of being carried out in various ways. Alternative exemplary embodiments relate to other features and combinations of features.

DETAILED DESCRIPTION

Figure 1:
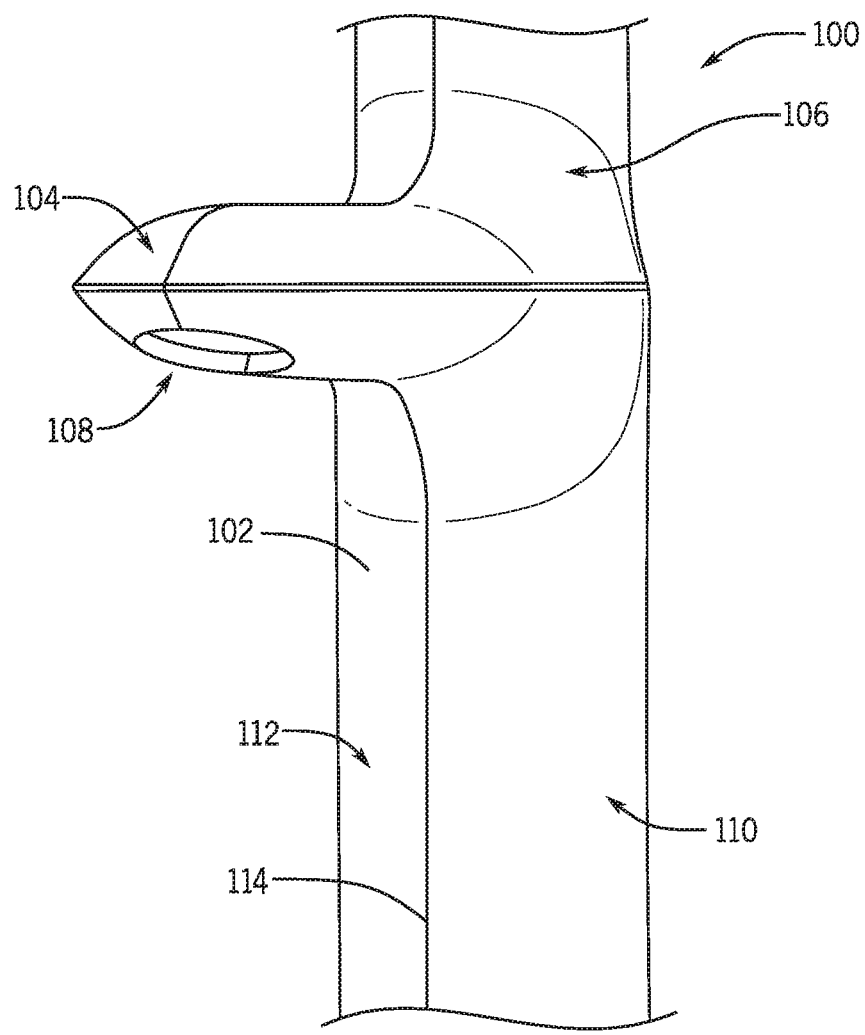
FIG. 1 is a perspective view of a faucet body constructed with a laser welding production process, according to an example embodiment.

Before turning to the figures, which illustrate the exemplary embodiments in detail, it should be understood that the present application is not limited to the details or methodology set forth in the description or illustrated in the figures. It should also be understood that the terminology used herein is for the purpose of description only and should not be regarded as limiting.

Referring generally to the Figures, various embodiments disclosed herein relate to a method for constructing a faucet body using a laser welding process. The faucet body includes at least a first body portion and a second body portion that are affixed to one another to substantially enclose a waterway that extends throughout the faucet body. In various embodiments, the faucet body is constructed by welding the first body portion to the second body portion through a laser welding process involving the application of a laser to a point at which edges of the first and second body portions abut against one another. For example, an optical beam emanating from a source (e.g., solid state, gaseous state or any other suitable laser such as a Nd: YAG laser) may be directed by optical components (e.g., optical fibers and/or hard optical components such as mirrors, lenses, gratings, and prisms) to the point to cause portions of the first and second faucet body portions to melt to form a welded joint. The laser or the combination of the workpieces (i.e., the first and second body portions) may then be translated relative to one another (e.g., by translating the optical beam along a path corresponding to surfaces of the edges of the first and second faucet body portions through adjustment of the optical components) to fixedly attach the first and second body portions at a welded joint. After the laser welding process, various finishing processes (e.g., welding, grinding, buffing, polishing, plating, etc.) may be performed on the outer surface of the body portion such that the outer surface has a desired appearance.

In various embodiments, the first and second body portions may each be constructed from separate pieces of material such as sheet metal via a stamping process. Alternatively, the faucet body portions may be constructed out of plastic by molding or any other suitable method. In the stamping process, the pieces of material are positioned between at least one die set of a stamping press. At least one of the components of the die set has a surface that corresponds to a desired outer surface of the faucet body. The die sets are pressed together such that each of the pieces of the material have portions with surfaces corresponding to a desired shape of the faucet body. Additional portions of the pieces of material (e.g., portions extending radially outward from trim lines) may be removed (e.g., via a laser cutting process) to form the first and second body portions prior to the performance of the laser welding process.

Such a process has several advantages over conventional die casting processes. Because each of the faucet body portions described herein are formed from a pre-selected material via a stamping process, the laser welding process disclosed herein provide manufacturers with greater control over material thicknesses and other dimensions. For example, using the process disclosed herein, materials having a thickness between 1 mm and 2 mm may be used. Such thicknesses are unobtainable when using traditional die casting methods. Thus, the systems and methods herein enable manufacturers to improve efficiency by reducing the amount of materials required. Additionally, the utilization of the stamping processes provides manufacturers with greater control over the final shape of the faucet body, as die sets enable precise control over the final shape of pressed materials.

Additionally, since the introduction of impurities and foreign particles into workpieces is inherent in the die casting process, the process herein will result in fewer workpiece impurities. As a result, fewer workpieces will be rejected post-fabrication. Additionally, manufacturers will avoid the die troubleshooting typically associated conventional die casting processes, thus further enhancing the efficiency benefits described above.

The avoidance of molten material will also result in lower emissions (e.g., because of the avoidance of the need for fuel used to heat the metal in die casting processes) and a safer, cleaner manufacturing environment (e.g., cleaner air, cleaner shop floor, less exposed hot surfaces, etc.). As such, the process is more environmentally friendly than traditional processes.

Referring now to FIG. 1 a faucet body 100 is shown, according to an example embodiment. The faucet body 100 includes a base portion 102, a spout portion 104, and an upper portion 106. In the example shown, the base portion 102 is substantially cylindrical and extends in a first direction. In various alternative embodiments, the base portion 102 is shaped differently, as the base portion 102 and the spout portion 104 may be of any geometric design. For example, in one embodiment, the base portion 102 is substantially rectangular-shaped. The spout portion 104 extends from an end of the base portion 102 in a second direction at an angle to the first direction. In the example shown, the angle is approximately 90 degrees. In alternative embodiments, the angle may have different values. For example, in some embodiments, the angle is greater than 90 degrees (e.g., 135 degrees). An end of the spout portion 104 includes an opening 108 configured to receive additional faucet components (e.g., an aerator). In the example shown, the spout portion 104 is an elongated shape (e.g., substantially oval-shaped) that has a smaller cross-sectional area than the base portion 102. In an alternative embodiment, the spout portion 104 is shaped similarly to the base portion 102 (e.g., the spout may also be substantially cylindrically shaped).

The base portion 102 and the spout portion 104 define a waterway through which water from a water source may flow upon the installation of a faucet assembly including the faucet body 100. As such, inner surfaces of the base portion 102 and the spout portion 104 substantially enclose a volume. The upper portion 106 extends from an end of the base portion 102 and is aligned with the base portion 102. In the example shown, the upper portion 106 is concentric with the base portion 102 and has a dimension (e.g., diameter) similar to that of the base portion 102. In various embodiments, an opening in an end of the upper portion 106 is configured to receive additional components of a faucet (e.g., a handle assembly, cartridge, etc.) after the manufacturing of the faucet body 100 in accordance with the process disclosed herein.

It should be understood that the faucet body 100 may take different forms than depicted in FIG. 1. For example, in one embodiment, the faucet body 100 does not include the upper portion 106. Additionally, the base portion 102, spout portion 104, and upper portion 106 may include any shape or size and still be consistent with the present disclosure.

As shown, the faucet body 100 includes a first body portion 110 and a second body portion 112. In the example shown, the first body portion 110 and the second body portion 112 are symmetrically shaped halves of the faucet body 100. In the example shown, the first and second body portions 110 and 112 are each continuous pieces of material (e.g., constructed from sheet metal via the processes described herein).

The first and second body portions 110 and 112 are fixedly attached to one another at a first welded joint 114. In various embodiments, the first welded joint 114 is formed by the laser welding process described herein. Faucet body 100 further includes a second welded joint substantially opposite to the first welded joint 114 (e.g., the first welded joint 114 and the second welded joint may be located on ends of a diameter of a circle defined by an inner surface of the base portion 102). The first welded joint 114 extends a first distance from a first end of the faucet body 100 (e.g., a lower end of the base portion 102), across the spout portion 104, to a second end of the faucet body 100 (e.g., an upper end of the upper portion 106). The second welded joint extends a second distance from the first end of the base portion 102 to the second end of the upper portion 106. In some embodiments, the first welded joint 114 and the second welded joint only partially extend the first and second distances between the first end of the base portion 102 and the second end of the upper portion 106.

Preferably, the first welded joint 114 and the second welded joint define substantially straight lines and/or lie in a single plane. Such a configuration facilitates the laser welding process described herein by, for example, simplifying the process of translating a laser beam across an area corresponding to the first welded joint 114 to create the first welded joint 114. However, alternative embodiments are envisioned. For example, in various alternative embodiments, the faucet body 100 may include additional welded joints extending in a direction that differs from the direction of extension of the first welded joint 114.

In various embodiments, the faucet body 100 includes more than two body portions. For example, in some embodiments, the faucet body 100 includes three or more body portions. In one embodiment, the faucet body 100 includes four body portions. Two of such body portions may form substantially half (e.g., a front half) of the base portion 102 and upper portion 106 while forming the entirety of the spout portion 104. The other two body portions may form the other half (e.g., a rear half) of the base portion 102 and the upper portion 106. The faucet body 100 may be constructed from any number of body portions in accordance with the present disclosure. For example, the number of body portions may be determined based on a desired external form of the faucet body 100 as well as the combination of components to be installed within the faucet body 100.

Figure 2A:
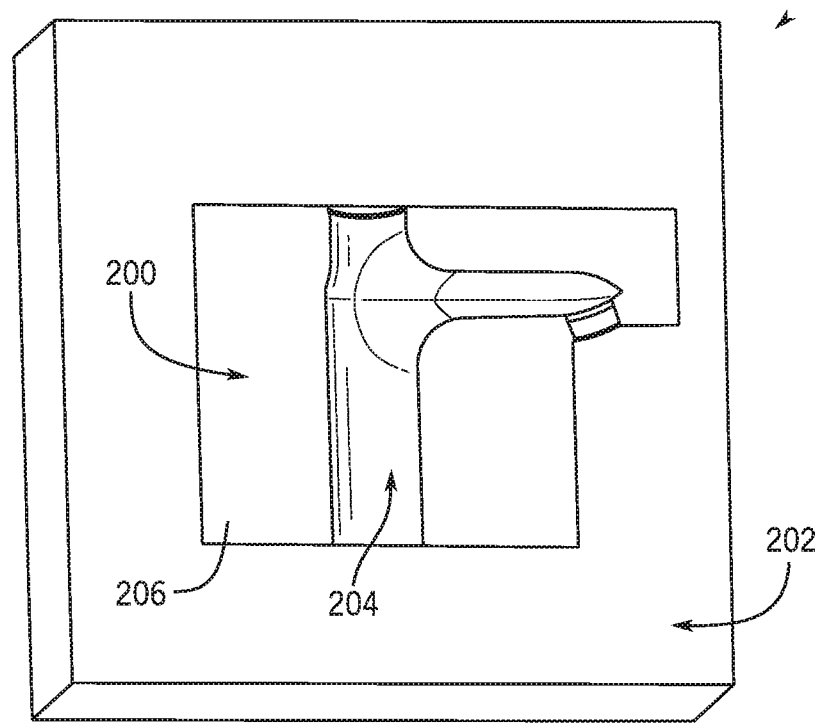
FIGS. 2A-2C are perspective views of a workpiece at various stages of a production process, according to an example embodiment.

Referring now to FIG. 2A, a workpiece 200 is shown, according to an example embodiment. In various embodiments, the workpiece 200 may be used to form the first and second body portions 110 and 112 of the faucet body 100 described with respect to FIG. 1. As such, reference may be made to the components of FIG. 1 to aid the description of FIG. 2. The workpiece 200 includes a single piece of material (e.g., sheet metal). In various embodiments, the workpiece 200 is shown just after the workpiece 200 has undergone a pressing process. In such a pressing process, a piece of material may go through a first pressing step (e.g., blanking) to form the workpiece 200 such that the workpiece 200 includes a desired set of dimensions. In the first pressing step, the piece of material may be placed over a blanking die including a gap (e.g., cavity, opening, etc.) having a set of dimensions that correspond to (e.g., within a predetermined threshold of) the desired dimensions of the workpiece 200. In various embodiments, the desired dimensions may be chosen based on the desired dimensions of the completed faucet body that the workpiece is used to construct. Additionally, the final shape of the sheet metal may be obtained in multiple stages, depending upon the desired shape of the part.

In an example, to form the first faucet body portion 110 discussed with respect to FIG. 1, the gap in the blanking die may include a first dimension (e.g., a height) that substantially corresponds to the desired height of the first body portion 110. The gap in the blanking die may further include a first portion being having a first width and a second portion having a second width that is larger than the first width. In an example, the height of the first portion is greater than a desired distance between an end (e.g., a bottom end) of the base portion 102 and the spout portion 104 of the faucet body 100 by a predetermined amount. As described herein, such a configuration facilitates the formation of the opening 108 in the end of the spout portion 104. Once the piece of material is placed onto the blanking die, a pressing apparatus may press a punch into the gap in the blanking die, causing the workpiece 200 having desired dimensions to shear from the initial piece of material. After this initial pressing step using the blanking die, workpiece 200 is generally a flat piece of material with a desired peripheral shape. In some embodiments, the workpiece 200 is provided with desired dimensions and a desired peripheral shape via an initial laser cutting process. In some embodiments, this blanking process is omitted.

Once the blanking or laser cutting process is performed, the workpiece 200 may undergo a metal forming process in a separate pressing apparatus. As shown in FIG. 2, the workpiece 200 is positioned over a first forming die 202. In various embodiments, the first forming die 202 is a component of a die set including a second forming die (e.g., the second die 306 in the die set of the pressing apparatus 300 described with respect to FIG. 3A). The first forming die 202 and the second forming die include corresponding male and female surfaces that correspond to the desired shape of an outer surface of the faucet body 100. The pressing apparatus may press the first forming die 202 into the second forming die (or vice versa) when the workpiece 200 is disposed between the first forming die 202 and the second forming die to form a pressed portion 204 in the workpiece 200 that has a shape corresponding to either the first body portion 110 or the second body portion 112 discussed with respect to FIG. 1. Alternatively, the second forming die may be pressed into the first forming die 202.

Figure 2C:
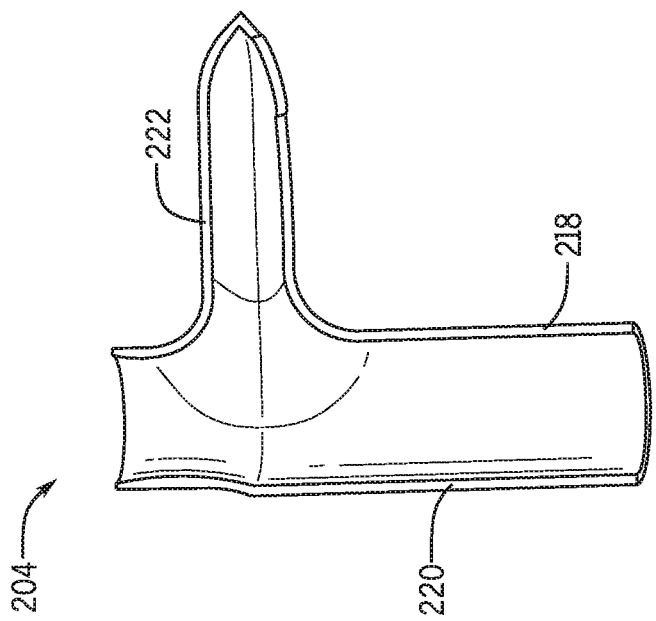
Figure 2B:
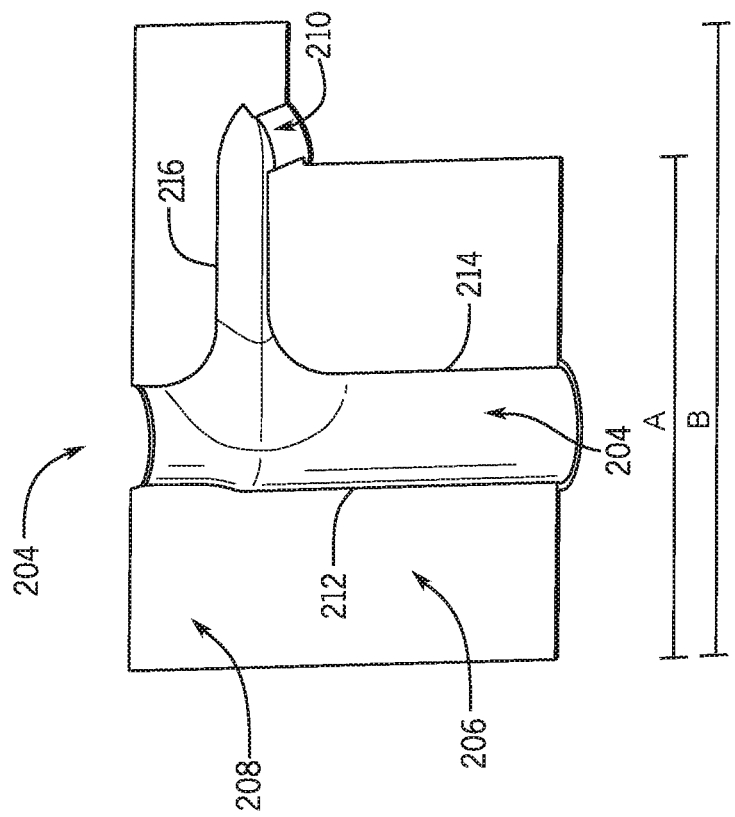

Referring now to FIG. 2B, the workpiece 200 removed from the pressing apparatus is shown, according to an example embodiment. As shown, the workpiece 200 includes a pressed portion 204 having a surface that corresponds to a desired shape of a body portion of the faucet body 100 (e.g., the first body portion 110). The workpiece 200 also includes a first portion 206 having a first width A and a second portion 208 having a second width B (e.g., corresponding to the gaps in the blanking die discussed with respect to FIG. 2A). In an embodiment, the width A is chosen based on the intended positioning of the opening 108 in the spout portion 104 of the faucet body 100. It should be understood that the workpiece 200 may be in configurations other than those shown. For example, in one embodiment, the workpiece is substantially rectangular-shaped.

As shown, the first portion 206 has a height that is less than the distance between a first edge (e.g., a bottom edge) of the workpiece 200 to a section of the pressed portion 204 that corresponds to the spout portion 104 of the faucet body 100. Such a configuration facilitates the formation of the opening 108 in the spout portion 104 (e.g., to create a water outlet point in the faucet body 100). Because the height of the first portion 206 is so chosen, a concave portion 210 may be formed (e.g., via the pressing process discussed with respect to FIG. 2A) at a dividing boundary (e.g., corner) between the first portion 206 and the second portion and 208. In an alternative embodiment, the opening 108 is formed after the faucet body portions 110 and 112 are welded to one another (e.g., via a laser cutting process). In such an embodiment, the workpiece 200 may have a different shape (e.g. a square or rectangular shape).

To formulate a body portion (e.g., the first body portion 110) of the faucet body 100, planar portions of the workpiece 200 are removed from the pressed portion 204. The planar portions extend outward from a first trim line 212, a second trim line 214, and a third trim lime 216. As shown, the first trim line 212 is substantially linear, and extends from a first (e.g., lower) edge of the workpiece 200 to a second edge (e.g., upper) edge of the workpiece 200. The second trim line 214 includes a first linear portion that extends from the first edge, a curving portion that extends from the first linear portion, a second linear portion that extends from the curving portion, a concave portion, and an end portion (e.g., extending outward from the concave portion). The second linear portion extends at an angle (e.g., approximately 90 degrees) from the first linear portion. The concave portion corresponds to the concave portion 210 of the workpiece 200 and is substantially semi-circular. In various other embodiments, the concave portion of the second trim line 214 may be differently shaped, depending on the desired configuration of the opening 108 in the spout portion 104. The third trim line 216 includes a curved portion extending from the second edge of the workpiece 200, a substantially linear portion, and a second curving portion that joins the end portion of the second trim line 214.

In various embodiments, the planar portions of the workpiece 200 are removed at the trim lines 212, 214, and 216 through a laser cutting process. In such a process, an optical beam from a light source (e.g., laser) is directed toward and focused on a point on one of the trim lines 212, 214, and 216 via various optical elements to create an opening at the point. The optical beam is then translated with respect to the workpiece 200 along a path defined by one of the trim lines 212, 214, 216 until a planar portion of the workpiece 200 extending outward of the trim line is separated from the pressed portion 204. In various other embodiments, alterative cutting methods (e.g., blanking) may be used to remove the planar portions.

Referring now to FIG. 2C, an isolated pressed portion 204 of the workpiece 200 is shown, according to an example embodiment. As shown, the pressed portion 204 includes edges 218, 220, and 222 located at positions previously occupied by the trim lines 212, 214, and 216 discussed with respect to FIG. 2B. In some embodiments, after the planar portions of the workpiece 200 are removed, the trim lines 212, 214, and 216 are processed (e.g., using a grinding apparatus) to form the edges 218, 220, and 222. In the example shown, the edges 218, 220, and 222 are each substantially planar and are each co-planar with respect to one another. Such an arrangement facilitates the joining of the pressed portion 204 with another similar pressed portion via the laser welding process described herein to formulate a faucet body such as the faucet body 100 discussed with respect to FIG. 1. However, edges 218, 220, and 222 may be in different planes without departing from the scope of the present disclosure.

Figure 3B:
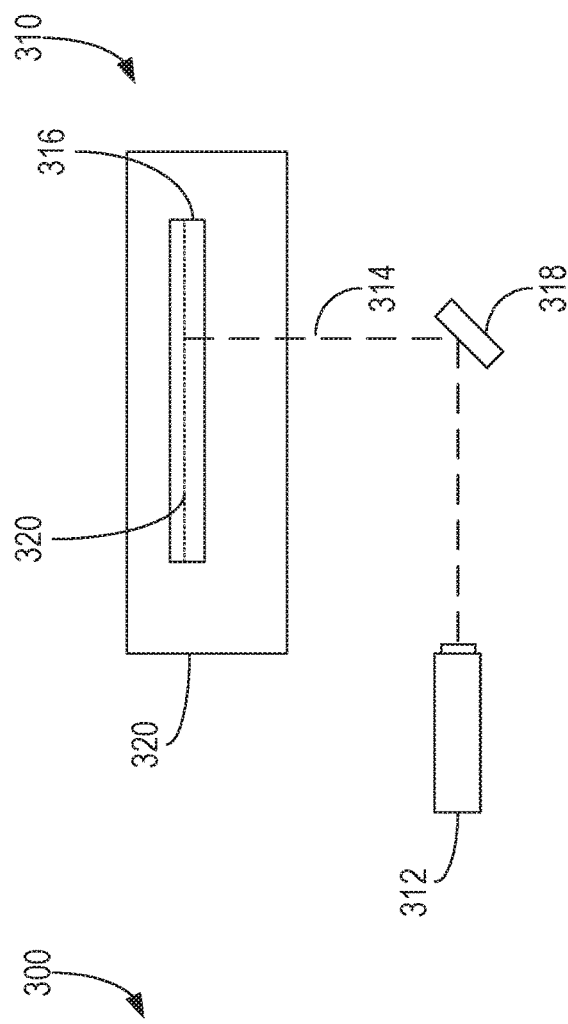
FIGS. 3A and 3B are schematic diagrams of apparatuses used in constructing a faucet body, according to an example embodiment.
Figure 3A:
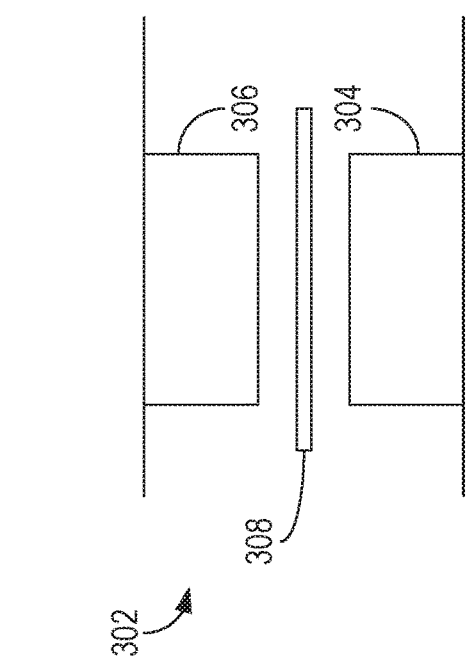

Referring now to FIG. 3A, a pressing apparatus 300 is shown, according to an example embodiment. Pressing apparatus 300 may be used to perform various processes discussed with respect to FIGS. 2A-2C. In this regard, pressing apparatus 300 includes a die set 302. The die set 302 includes a first die 304 and a second die 306. The first and second dies 304 and 306 are fixed to members that are movable (e.g., by a hydraulic press) with respect to one another. For example, the first die 304 may move in a substantially vertical direction towards the second die 306 until surfaces of the first and second dies 304 press against one another.

The form that the first and second dies 304 and 306 take may depend on manufacturing step that the pressing apparatus 300 is used for. For example, in embodiments where the pressing apparatus 300 is used in the blanking process described with respect to FIG. 2A, the first die 304 may include a punch or the like having a shape corresponding to a cavity in the second die 306, which may be configured as a blanking die. To perform this process, a piece of material 308 is inserted between the first die 304 and the second die 306 over the cavity in the second die 306. A press then forces the first die 304 through the cavity in the second die 306, thereby causing a workpiece having desired dimensions and a desired peripheral shape to be sheared from the piece of material 308.

In another example, the pressing apparatus 300 is used to form a workpiece into a desired shape of a faucet body portion. In such embodiments, the first and second dies 304 and 306 include male and female counterpart portions. Each of the male and female counterpart portions have surfaces corresponding to a desired shape of a formed faucet body portion. The piece of material 308 (e.g., the workpiece 200 discussed with respect to FIGS. 2A-2C) is then inserted between the first and second dies 304 and 306 to create a pressed portion having shapes corresponding to the desired shape.

Referring now to FIG. 3B, a laser processing apparatus 310 is shown, according to an example embodiment. Laser processing apparatus 310 may be used to perform various processes discussed herein. Laser processing apparatus 310 includes a laser 312 configured to emit an optical beam 314 along an optical path towards an element 316. In some embodiments, at least one optical element 318 (e.g., a mirror, lens, prism, grating, etc.) is disposed in the optical path to direct the optical beam 314 towards the element 316. In some embodiments, the optical element 318 is configured to alter the path of the optical beam 314. For example, in an embodiment, a controller controls a rotational angle of the optical element 318 to cause the optical beam 314 to travel along a predetermined path. It should that additional optical elements may be disposed along the optical path to condition (e.g., focus, shape) the optical beam 314 prior to the optical beam 314 reaching the element 316.

The laser processing apparatus 310 also includes a holding apparatus 320 configured to hold the element 316 in a desired position. For example, the holding apparatus 320 may include a movable platform and a clamp. The clamp may affix the element 316 to the movable platform and the controller may translate the movable platform with respect to a stationary element of the holding apparatus 320 to translate the element 316 with respect to the optical beam 314.

The laser processing apparatus 300 may operate in a number of configurations based on the manufacturing step that the laser processing apparatus is used for. For example, in embodiments where the laser processing apparatus 300 is being used to weld body portions of a faucet to one another, the element 316 may include portions of a faucet body held together by the holding apparatus 320. The laser processing apparatus 300 apparatus may cause the optical beam 314 to move relative the element 314 down a predetermined path where meeting edges of the faucet body portions are held together to form a welded joint 320. For example, a computerized controller may rotate the optical element 318 to cause the optical beam 314 to move down the welded joint 320. Alternatively or additionally, the controller may cause a portion of the holding element 320 to move with respect to the optical beam 314 to create the welded joint 320.

In another example, the laser processing apparatus 300 may be used to form a workpiece (e.g., the workpiece 200) having desired dimensions and a desired peripheral shape. In such an embodiment, the element 316 may comprise a blank, and the laser welding apparatus 300 may cause the optical beam 314 to move in another predetermined path corresponding to a desired circumference of a workpiece. It should be understood that the laser processing apparatus 300 is configured differently when used for laser cutting applications versus laser welding applications. In yet another example, the laser processing apparatus may be used to remove a portion from a workpiece to create a faucet body portion having a desired shape. For example, the optical beam 314 may move in a path relative to the element 316 along a trim line separating planar portions of a workpiece from a pressed portion (e.g., the pressed portion 204 discussed with respect to FIG. 2C). As will be understood, the rate of movement of the optical beam 314 with respect to the element 316 may change depending on the implementation.

Figure 4:
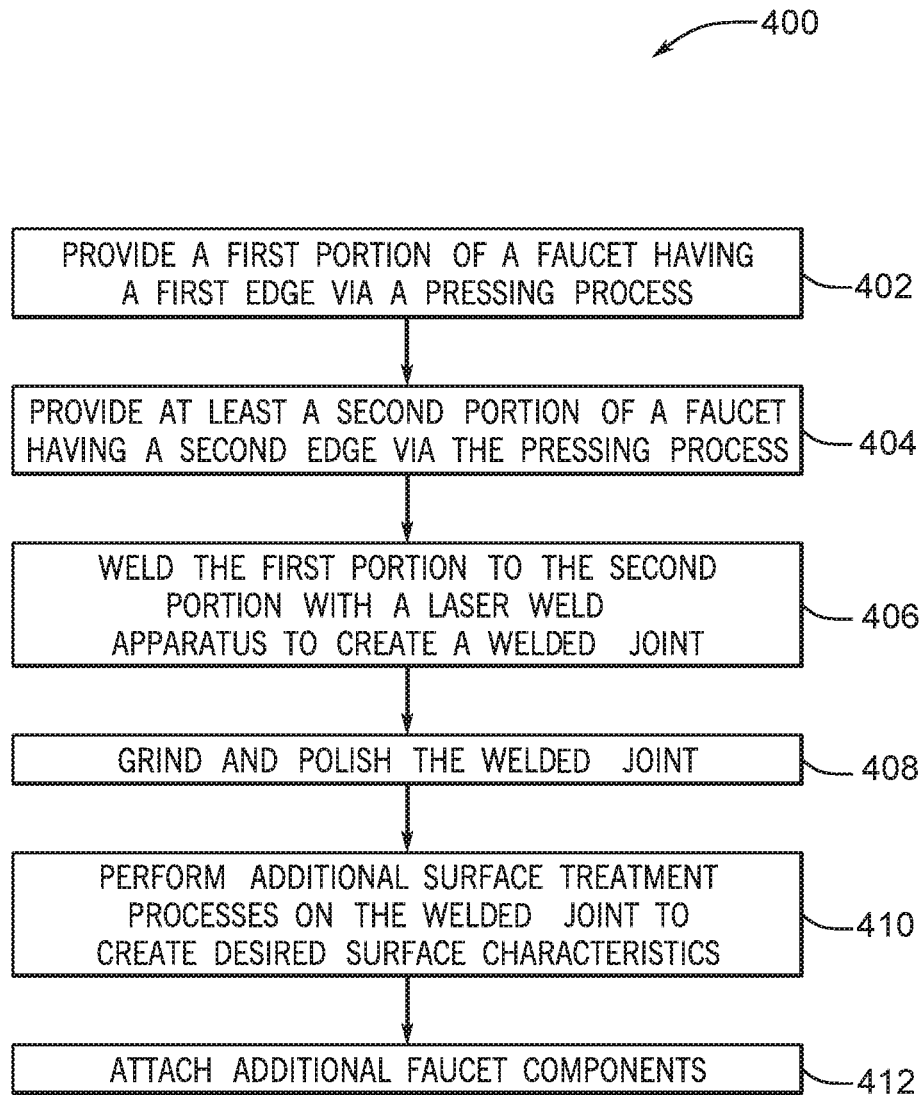
FIG. 4 is a flow diagram of a method of producing a faucet, according to an exemplary embodiment.

Referring now to FIG. 4, a flow diagram of a process 400 of manufacturing a faucet using a laser welding process is shown, according to an example embodiment. Process 400 begins by providing a first portion of a faucet having a first edge via a pressing process (block 402). For example, a piece of sheet metal may undergo a pressing and cutting process similar to the process described with respect to FIGS. 2A-2C to provide the first portion of the faucet. In such a process, a piece of sheet metal may first undergo a blanking process to generate a first workpiece. The first workpiece is then pressed by a metal pressing apparatus including a first die set. The first die set includes female and male components having portions with surfaces that correspond to a desired shape of a portion of the faucet body. As such, upon being pressed by the metal pressing apparatus, the workpiece includes a portion having the desired shaped. Extraneous portions of the workpiece are then removed (e.g., via a laser cutting process) to form the first portion of the faucet having the first edge.

Process 400 may further include providing at least a second portion of a faucet having a second edge via the pressing process (block 404). In an embodiment, the second portion of the faucet is substantially similar to the first portion of the faucet (e.g., a mirror image of the first portion of the faucet). In such an embodiment, the second workpiece may be inserted into a pressing apparatus including a second die set having female and male components with surfaces that are mirror images to those of the first die set. In other embodiments (i.e., where the second portion of the faucet is not a mirror image of the first portion of the faucet), the second workpiece may be inserted into a pressing apparatus including a differently shaped second die set. In some embodiments, the faucet body is designed to include more than two faucet body portions. In such embodiments, the pressing process described with respect to FIGS. 2A-2C may be repeated for each faucet body portion (e.g., using different pressing apparatuses or die sets to create additional body portions having desired shapes).

Process 400 may further include welding the first portion to the second portion using a laser welding apparatus to create a first welded joint (block 406). For example, after creation of the first and second portions of the faucet, edges of the first and second portions may be pressed together while an optical beam emanating from a light source (e.g., a laser) is directed to and focused on a position where a first edge of the first portion abuts the second edge of the second portion as a result of the pressing. The focused optical beam causes the first and second optical portions to melt and form a welding point. The optical beam is then translated with respect to the first and second portions (e.g., a controller may adjust the rotational position of an optical element such as a lens to cause the optical beam to translate along a first predetermined path corresponding to the shape of the edges of the first and second portions of the faucet) to form a series of welding points that defines the welded joint.

Such a process may then be repeated to form additional welded joints on the faucet body. For example, where the first and second portions of the faucet include symmetrical halves of a faucet body, a second welded joint may be formed in a manner similar to the first welded joint. In such an embodiment, the second welded joint opposes (i.e. the first and second welded joints are a maximal distance from one another) the first welded joint. As such, after the formation of the first welded joint, the first and second portions of the faucet may be rotated at an angle (e.g., 180 degrees) with respect to the source of the optical beam prior to the optical beam forming the second welded joint that is substantially parallel to the first welded joint. In other embodiments, the optical beam may be directed along an alternative path to form the second welded joint without rotating the first and second portions. In yet still other embodiments, multiple optical beams may be provided (e.g., from multiple light sources) such that the first and second welded joints may be formed at the same time. In an embodiment, both the first and second welded joints are substantially linear and a parallel to one another.

In some embodiments, where, for example, there are more than two portions of the faucet body to be laser welded to one another, additional welded joints may be formed via a process similar to that discussed above. In some embodiments, different welded joints may differ from one another in shape. In such cases, the laser welding apparatus may cause the optical beam to translate with respect to the portions of the faucet in different predetermined paths depending on the positioning of the welded joint being formed.

Process 400 may further include grinding and polishing the welded joint (block 408). In various embodiments, it is desirable to ensure that an outer surface of the faucet body is smooth. Thus, to the extent that the laser welding process discussed above creates discontinuities in the outer surface, additional processes may be performed to remove such discontinuities. For example, an angle grinder including an abrasive disc may be used to smooth the welded joint. Next, a different grinder having an abrasive disc of different coarseness may be used to polish the welded joint. Such a process may be repeated for each welded joint produced at block 406.

Process 400 may further include performing additional surface treatment processes on the welded joint or external surface of the faucet body to create a faucet body having desired surface characteristics (block 410). For example, after the grinding and polishing of the welded joints, the entirety of the outer surface of the assembled faucet body may be deburred, cleaned, polished, and buffed. Additionally, decorative finishes may be applied to outer surface of the faucet body to create a desired appearance. For example, the outer surface may be electroplated with a first coating (e.g., a nickel coating), coated with an electrostatically applied material (e.g., a polymeric material), or coated via a physical vapor deposition process. Any known finishing process may be used to provide the faucet body with a desired external appearance. For example, upon plating the external surface of the faucet body, a coating of paint may be applied to the outer surface.

Process 400 further includes attaching additional faucet components to the finished faucet body (block 412). To complete assembly of the faucet, various other components, may be placed in or attached to the assembled faucet body. For example, elements of a handle assembly (e.g., a handle lever, bonnet assembly, etc.), a water outlet assembly (e.g., an aerator, a diverter), and a valve assembly (e.g., a cartridge) may be attached to the finished faucet body. In various embodiments, some of such components require mounting brackets to be affixed to an internal surface of the faucet body. In some embodiments, such brackets may be mounted via laser welding or via conventional brazing or welding techniques. In some embodiments, a portion of such components are attached to the faucet body prior to finishing the outer surface of the faucet body and/or prior to the welding of the first portion of the faucet to the second portion of the faucet (e.g., a mounting bracket may be mounted to a first faucet body portion via laser welding prior to the first faucet body portion being welded to the second faucet body portion).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method for manufacturing a faucet including a base and a spout comprising:
    providing a first stamped faucet portion defining a first edge extending a distance between the base and the spout;
    providing a second stamped faucet portion defining a second edge extending the distance;
    positioning, by a holding apparatus, the first edge of the first faucet portion against the second edge of the second faucet portion;
    welding, by a laser welding apparatus, the first edge of the first faucet portion to the second edge of the second faucet portion to form a welded joint extending along the distance; and
    subsequently grinding, by an angle grinder having an abrasive disc, the welded joint to form a body of the faucet;
    wherein the first faucet portion is made from a first sheet of material and the second faucet portion is made from a second sheet of material; and
    wherein the laser welding apparatus includes:
        a laser configured to emit an optical beam along an optical path; and
        a rotatable optical element configured to alter the path of the optical beam towards the first faucet portion and the second faucet portion to form the welded joint.

2. The method of claim 1, wherein the providing the first stamped faucet portion includes:
    providing the first sheet of material;
    positioning the first sheet of material between a first die set of a first stamping press including a female component and a male component, the female and male components including portions having surfaces that correspond to an outer surface of the first faucet portion;
    pressing, by the first stamping press, the male component into the female component such that the first sheet of material includes a first portion of having a surface corresponding to the outer surface of the first faucet portion and a second portion; and
    removing the second portion of the first sheet of material.

3. The method of claim 2, wherein the providing the second stamped faucet portion includes:
    providing the second sheet of material;
    positioning the second sheet of material between the first die set of the first stamping press;
    pressing, by the first stamping press, the male component into the female component such that the second sheet of material includes first portion having a surface corresponding to the outer surface of the second faucet portion and a second portion; and
    removing the second portion of the second sheet of material.

4. The method of claim 3, wherein the removing the second portions of the first and second sheets of material is performed via a laser cutting apparatus.

5. The method of claim 3, wherein the first and second sheets of material are constructed of sheet metal.

6. The method of claim 3, wherein the first and second sheets of material have thicknesses of approximately 1 to 2 mm.

7. The method of claim 2, wherein the providing the second stamped faucet portion includes:
    providing the second sheet of material;
    positioning the second sheet of material between a second die set of a second stamping press including a female component and a male component, the female and male components including portions having surfaces that correspond to an outer surface of the second faucet portion, wherein the second die set is different from the first die set;

pressing, by the second stamping press, the second male component into the second female component such that the second sheet of material includes first portion having a surface corresponding to the outer surface of the second faucet portion and a second portion; and removing the second portion of the second sheet of material.

8. The method of claim 1, further comprising attaching a support bracket configured to hold an additional faucet component to a combination of the first and second faucet portions, the additional faucet component at least one of a cartridge and a fixing hose.

9. The method of claim 8, wherein the attaching the support bracket is performed by the laser welding apparatus.

10. The method of claim 1, wherein first faucet portion defines a third edge and the second faucet portion defines a fourth edge, the method further comprising welding, by the laser welding apparatus, the third edge of the first faucet portion to the fourth edge of the second faucet portion to form a second welded joint.

11. The method of claim 10, wherein the first and second welded joints are substantially parallel to one another.

12. The method of claim 1, wherein the first and second faucet portions are symmetrical halves of the faucet body.

13. The method of claim 1, further comprising applying a coating to the first and second portions such that the coating covers the welded joint, wherein applying the coating is performed by at least one of a physical vapor deposition process or an electroplating process.

14. A method for manufacturing a faucet including a base and a spout comprising:
providing a first stamped faucet portion defining a first edge extending a first distance between an end of the base and the spout and a second edge extending a second distance between an upper end of the faucet and the end of the base;

providing a second stamped faucet portion defining a third edge extending the first distance and a fourth edge extending the second distance;

positioning, by a holding apparatus, the first edge of the first faucet portion against the third edge of the second faucet portion;

welding, by a laser welding apparatus, the first edge of the first faucet portion to the third edge of the second faucet portion to form a first welded joint extending at least a portion of the first distance from the end of the base;

positioning, by the holding apparatus, the second edge of the first faucet portion against the fourth edge of the second faucet portion; and welding, by the laser welding apparatus, the second edge of the first faucet portion to the fourth edge of the second faucet portion to form a second welded joint extending at least a portion of the second distance from the end of the base;

wherein the first faucet portion is made from a first sheet of material and the second faucet portion is made from a second sheet of material; and wherein the laser welding apparatus includes:
a laser configured to emit an optical beam along an optical path; and
a rotatable optical element configured to alter the path of the optical beam towards the first faucet portion and the second faucet portion to form the first and second welded joints.

15. The method of claim 14, wherein the first welded joint lies in the same plane as the second welded joint.

16. The method of claim 14, wherein the first welded joint extends continuously along the entirety of the first distance, wherein the second welded joint extends continuously along the entirety of the second distance.

* * * * *